United States Patent
Teratani et al.

(10) Patent No.: US 11,806,660 B2
(45) Date of Patent: Nov. 7, 2023

(54) CARBON DIOXIDE GAS SEPARATION METHOD AND CARBON DIOXIDE GAS SEPARATION APPARATUS

(71) Applicant: JGC Corporation, Yokohama (JP)

(72) Inventors: Shogo Teratani, Yokohama (JP); Syuichi Oguro, Yokohama (JP); Hiroaki Hasegawa, Yokohama (JP); Junya Okazaki, Yokohama (JP)

(73) Assignee: JGC Corporation, Yokohama (JP)

( * ) Notice: Subject to any disclaimer, the term of this patent is extended or adjusted under 35 U.S.C. 154(b) by 60 days.

(21) Appl. No.: 17/275,751

(22) PCT Filed: Jan. 29, 2019

(86) PCT No.: PCT/JP2019/002985
§ 371 (c)(1),
(2) Date: Mar. 12, 2021

(87) PCT Pub. No.: WO2020/157830
PCT Pub. Date: Aug. 6, 2020

(65) Prior Publication Data
US 2022/0054973 A1  Feb. 24, 2022

(51) Int. Cl.
*B01D 53/22* (2006.01)
*B01D 71/02* (2006.01)
*C10L 3/10* (2006.01)

(52) U.S. Cl.
CPC ......... *B01D 53/228* (2013.01); *B01D 71/028* (2013.01); *C10L 3/104* (2013.01); *C10L 2290/548* (2013.01)

(58) Field of Classification Search
None
See application file for complete search history.

(56) References Cited

U.S. PATENT DOCUMENTS

| 2013/0213226 A1 | 8/2013 | Feng et al. |
| 2017/0368497 A1* | 12/2017 | Priske .................. B01D 53/228 |

(Continued)

FOREIGN PATENT DOCUMENTS

| JP | 2009-61422 A | 3/2009 |
| JP | 2013-180229 A | 9/2013 |

(Continued)

OTHER PUBLICATIONS

English language machine translation for JP 2017-177089. Retrieved from translationportal.epo.org on Jan. 18, 2023. (Year: 2023).*

*Primary Examiner* — Jason M Greene
(74) *Attorney, Agent, or Firm* — Jordan and Koda, PLLC; Steven P. Koda (57) ABSTRACT

Carbon dioxide gas in a high-pressure gas to be treated is stably separated using a separation membrane. Upon separating carbon dioxide gas in a high-pressure gas to be treated using a separation membrane module including a separation membrane, a preliminary boosted gas is supplied to the separation membrane module before the supply of natural gas is started to boost a pressure on a primary side of the separation membrane to a preliminary pressure between a stand-by pressure and an operating pressure. Thus, when the supply of a high-pressure gas to be treated is started to increase the pressure of the separation membrane module to an operating pressure, an abrupt decrease in temperature of the gas to be treated can be suppressed.

12 Claims, 7 Drawing Sheets

(56) References Cited

U.S. PATENT DOCUMENTS

2018/0185784 A1 7/2018 Kodama et al.
2019/0083926 A1* 3/2019 Kitaura ................ B01D 53/228

FOREIGN PATENT DOCUMENTS

| JP | 2015-508020 A | 3/2015 | | |
|---|---|---|---|---|
| JP | 2017-6820 A | 1/2017 | | |
| JP | 2017-148741 A | 8/2017 | | |
| JP | 2017-177089 A | 10/2017 | | |
| JP | 2017177189 | * 10/2017 | ............ | B01D 53/22 |
| JP | 2018-511472 A | 4/2018 | | |

* cited by examiner

CARBON DIOXIDE GAS SEPARATION METHOD AND CARBON DIOXIDE GAS SEPARATION APPARATUS

BACKGROUND OF THE INVENTION

The present invention relates to a carbon dioxide gas separation method and a carbon dioxide gas separation apparatus which separate carbon dioxide gas in a gas to be treated.

BACKGROUND ART

Natural gas that is hydrocarbon gas produced from a wellhead is subjected to a pre-treatment for removing impurities using various treatment facilities. The natural gas from which impurities are removed may be shipped as it is via a pipeline or may be subjected to a liquefaction treatment of liquefying the natural gas by a liquefaction treatment facility at the subsequent stage to obtain liquefied natural gas (LNG), in some cases. As the impurities contained in the natural gas, for example, impurities containing a relatively large amount of carbon dioxide ($CO_2$) gas are mentioned, and in order to obtain a product gas as a raw material for pipeline gas or liquefied natural gas, it is necessary to remove $CO_2$ gas.

A $CO_2$ gas separation apparatus separating $CO_2$ gas from natural gas includes, for example, as illustrated in Patent Document 1, a $CO_2$ gas separation module including an inorganic separation membrane made of zeolite or the like. Further, natural gas that is a gas to be treated is supplied to the $CO_2$ gas separation module, $CO_2$ is permeated through the inorganic separation membrane, and thereby $CO_2$ gas is separated from hydrocarbon gas that cannot be permeated through the inorganic separation membrane.

However, in recent years, in $CO_2$ gas separation apparatuses, the necessity of treating natural gas containing high-concentration $CO_2$ gas such as natural gas accompanied with crude oil by $CO_2$ injection or natural gas produced from a natural gas field has been increasing. It has been found that, in a case where high-pressure natural gas containing a large amount of $CO_2$ gas is started to be supplied to a $CO_2$ gas separation module that is in an atmospheric pressure state in this way, problems that have been conventionally unknown may become more severe in some cases.

CITATION LIST

Patent Document

Patent Document 1: JP-A-2017-148741

SUMMARY OF THE INVENTION

The invention has been conceived under such circumstances, and an object thereof is to provide a technique of stably separating carbon dioxide gas in a high-pressure gas to be treated using a separation membrane.

A carbon dioxide gas separation method of the invention is a carbon dioxide gas separation method of permeating carbon dioxide gas in a gas to be treated from a primary side to a secondary side of a separation membrane provided in a separation membrane module to reduce the carbon dioxide gas in the gas to be treated, the method characterized by including:

a step of supplying a preliminary boosted gas to the primary side of the separation membrane to boost the pressure to a preliminary pressure between a stand-by pressure and an operating pressure, before the gas to be treated is supplied at a supply pressure higher than the stand-by pressure to the separation membrane module in a state of the stand-by pressure lower than the operating pressure when the carbon dioxide gas is permeated through the separation membrane, in order to maintain a temperature of the gas to be treated in which a decrease in pressure occurs to a temperature higher than a condensation temperature of the carbon dioxide gas or a solidification temperature of the carbon dioxide gas; and a subsequent step of supplying the gas to be treated to the separation membrane module to increase the pressure of the separation membrane module to the operating pressure and to reduce the carbon dioxide gas in the gas to be treated.

The carbon dioxide gas separation method may include the following characteristics:

(a) the separation membrane is an inorganic separation membrane;

(b) the gas to be treated is heated by a heating unit and then supplied to the separation membrane module;

(c) a pressure difference between the operating pressure and the stand-by pressure is 0.5 MPa or higher;

(d) a concentration of the carbon dioxide gas in the gas to be treated is 30% or more and less than 100% in molar ratio;

(e) the preliminary pressure is a pressure of $P_{Pre}$ or higher defined by the following Formula (1) to Formula (3) when the operating pressure is designated as $P_{Ope}$, a vapor pressure of the carbon dioxide gas at 20° C. is designated as $P_{Vap}$, and a concentration (molar ratio) of the carbon dioxide gas in the gas to be treated is designated as $C_{CO2}$:

$$\ln(P_{Pre})=a\times[1/[(P_{Ope}/P_{Vap})^2+(P_{Ope}/P_{Vap})^3]]+b \quad \text{Formula (1)}$$

$$a=0.1318\times(C_{CO2})-13.63 \quad \text{Formula (2)}$$

$$b=0.8886\times\ln(C_{CO2})-2.372 \quad \text{Formula (3); and}$$

(f) the preliminary boosted gas is at least one gas selected from nitrogen gas, helium gas, and methane gas.

A carbon dioxide gas separation apparatus of the invention is a carbon dioxide gas separation apparatus separating carbon dioxide gas contained in a gas to be treated, the carbon dioxide gas separation apparatus characterized by including:

a separation membrane module including a separation membrane and allowing carbon dioxide gas to permeate from a primary side to a secondary side of the separation membrane to reduce the carbon dioxide gas in the gas to be treated;

a gas-to-be-treated supply path connected to a space on the primary side in the separation membrane module and supplying the gas to be treated containing carbon dioxide gas;

a carbon dioxide gas flow path connected to a space on the secondary side in the separation membrane module and allowing the carbon dioxide gas permeated through the separation membrane to flow out;

a non-permeation gas flow path connected to the space on the primary side and allowing non-permeation gas obtained after the carbon dioxide gas is separated to flow out; and a preliminary boosted gas supply path supplying a preliminary boosted gas to the primary side of the separation membrane in the separation membrane module, in which the preliminary boosted gas is supplied from the preliminary boosted gas supply path to boost the pressure in the space on the primary side to a preliminary pressure between a stand-by pressure and an operating pressure, before the gas to be treated is supplied at a supply pressure higher than the stand-by pressure to the separation membrane module in a state of the stand-by pressure lower than the operating pressure when the carbon dioxide gas is permeated through the separation membrane, in order to maintain a temperature of the gas to be treated in which a decrease in pressure occurs to a temperature higher than a condensation temperature of the carbon dioxide gas or a solidification temperature of the carbon dioxide gas.

According to the invention, upon separating carbon dioxide gas in a high-pressure gas to be treated using the separation membrane, the pressure on the primary side of the separation membrane is boosted to the preliminary pressure before the supply of the gas to be treated is started. Thus, an abrupt decrease in temperature of the gas to be treated when the high-pressure gas to be treated is supplied can be suppressed so that a temperature equal to or higher than the condensation temperature or solidification temperature of the carbon dioxide gas can be maintained.

DETAILED DESCRIPTION OF PREFERRED EMBODIMENTS OF THE INVENTION

Figure 1:
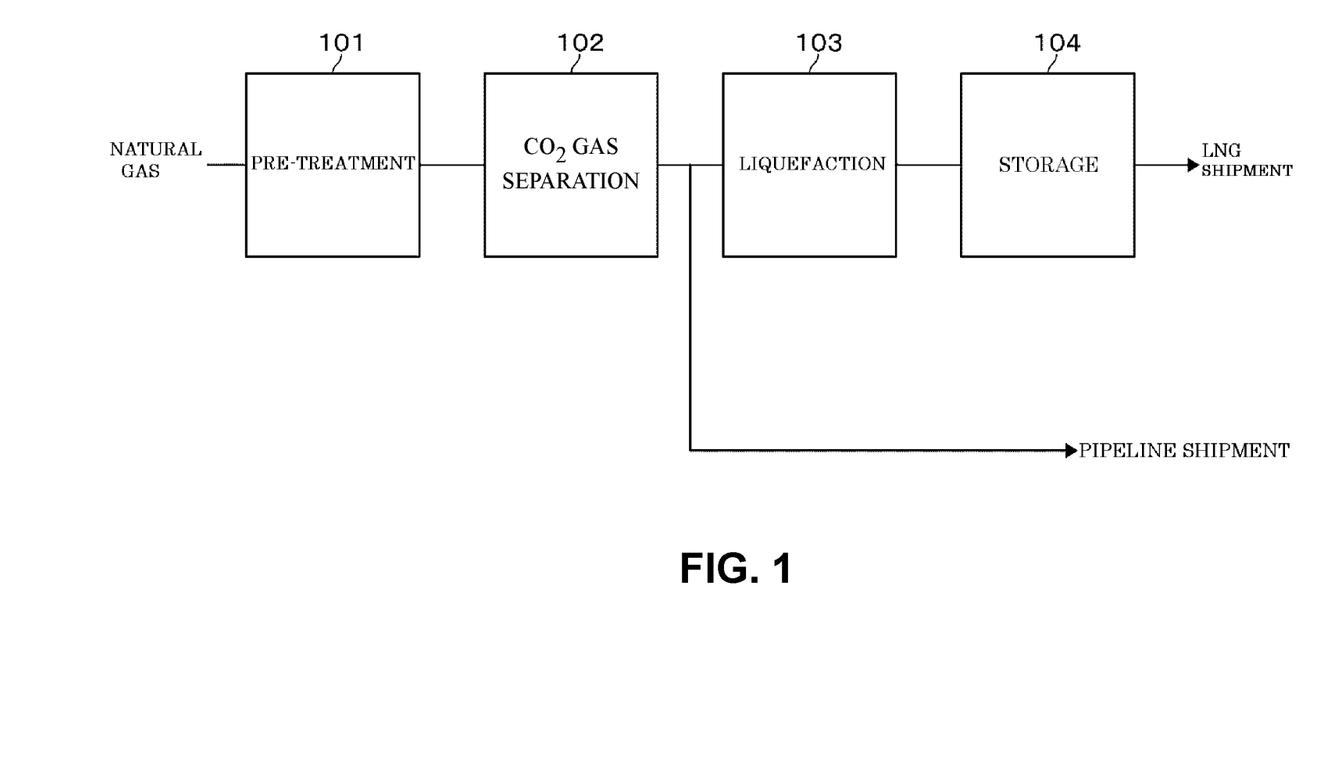
FIG. 1 is a process chart illustrating a productization treatment of natural gas.

First, the flow of a treatment of natural gas will be described. As illustrated in FIG. 1, natural gas (gas to be treated) produced from a wellhead is subjected to, for example, gas-liquid separation or moisture removal in a pre-treatment 101. Then, $CO_2$ gas separation 102 in which carbon dioxide ($CO_2$) is removed is further performed. The natural gas from which $CO_2$ gas is removed may be supplied to a consumer via a pipeline or may become liquefied natural gas (LNG) through liquefaction 103 and be shipped through storage 104, for example, in some cases.

Figure 2:
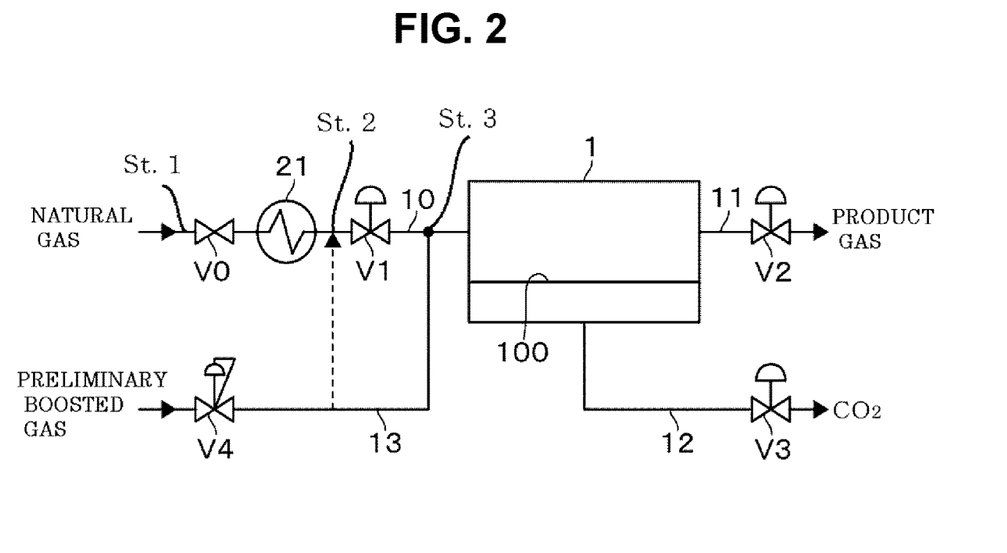
FIG. 2 is a configuration diagram illustrating a $CO_2$ gas separation apparatus.

FIG. 2 is a configuration diagram illustrating a $CO_2$ gas separation apparatus used in the $CO_2$ gas separation 102. The $CO_2$ gas separation apparatus includes a separation membrane module 1, and for example, an inorganic separation membrane 100 that is a separation membrane separating $CO_2$ gas by permeation is provided in the separation membrane module 1. As a material constituting the inorganic separation membrane 100, for example, an inorganic material highly resistant to heavy hydrocarbon such as a DDR-type zeolite membrane is adopted.

The specific structure of the inorganic separation membrane 100 is not limited to a specific type, and examples thereof include a tubular member having a DDR-type zeolite membrane formed on the surface of a pipe-shaped base body made of porous ceramic or the like. Further, a large number of tubular members having the inorganic separation membrane 100 formed therein are stored in a metallic main body, a space on a primary side where natural gas flows and a space on a secondary side where $CO_2$ gas separated from the natural gas flows are partitioned, and thereby the separation membrane module 1 is configured.

A natural gas supply path (gas-to-be-treated supply path) 10 supplying natural gas to the space on the primary side of the inorganic separation membrane 100 is connected to the separation membrane module 1. Reference numeral 21 provided on the natural gas supply path 10 is a heating unit. Further, a product gas discharge path (non-permeation gas flow path) 11 for discharging the natural gas (non-permeation gas) obtained after flowing through the space on the primary side to separate $CO_2$ gas is connected to the separation membrane module 1. Furthermore, the separation membrane module 1 includes a $CO_2$ gas discharge path (permeation gas flow path) 12 discharging permeation gas (for example, $CO_2$ gas) that has been permeated to the secondary side of the inorganic separation membrane 100. In FIG. 2, V0 is an opening/closing valve, V1 is a flow rate control valve, and V2 and V3 are pressure control valves.

Such a $CO_2$ gas separation apparatus may be stopped for maintenance or the like, and may be kept on standby in a state where the inside of the $CO_2$ gas separation apparatus is at an atmospheric pressure after the fluid thereinside is discharged and a necessary procedure is performed, in some cases. On the other hand, natural gas to be supplied from a wellhead side is supplied in a state of a high pressure of, for example, about 15 MPa. When high-pressure natural gas is supplied to the separation membrane module 1 that is kept on standby in a state of a stand-by pressure (approximately atmospheric pressure) lower than an operating pressure when $CO_2$ gas is permeated through the inorganic separation membrane 100, the following problems may occur in some cases.

In a case where the gas to be treated is a gas having a higher pressure than the stand-by pressure, when natural gas is supplied to the $CO_2$ gas separation apparatus illustrated in FIG. 2, the natural gas passes through the flow rate control valve V1 and is released at once to a low-pressure atmosphere.

When a high-pressure gas is released into a low-pressure atmosphere, the temperature is decreased by Joule-Thomson effect according to the pressure difference. For example, when high-pressure natural gas having a pressure of about 15 MPaG is released to an air atmosphere (pressure≈0.1 MPa), the temperature may be decreased to a temperature at which the $CO_2$ gas contained in the natural gas is liquefied or solidified. As a result, in the separation membrane module 1, for example, liquefied $CO_2$ or dry ice adheres to the inorganic separation membrane 100, so that the permeation performance of the inorganic separation membrane 100 is degraded.

In order to suppress liquefaction or solidification of the $CO_2$ gas according to such a temperature decrease, for example, a method of heating natural gas to a high temperature using the heating unit 21 and supplying the heated natural gas to the separation membrane module 1 is considered. However, the heating unit 21 is provided for managing a dew point of moisture contained in natural gas; meanwhile, a heating temperature necessary for suppressing liquefaction or solidification of the $CO_2$ gas is too high as compared to a heating temperature at the time of managing a dew point. Therefore, for a high-temperature heating operation that is performed only at the time of start-up, the heating unit 21 having heating performance over the specification that is not necessary at the time of usual operation needs to be prepared.

In order to solve such problems, in the $CO_2$ gas separation apparatus of this example, at the time of start-up of the $CO_2$ gas separation apparatus, a preliminary boosted gas is supplied to the separation membrane module 1 before natural gas is supplied to perform preliminary pressure boosting in which the internal pressure is increased to be higher than the stand-by pressure. Thereby, a difference in pressure between natural gas to be supplied and the separation membrane module 1 is decreased, and an abrupt decrease in temperature of the natural gas is suppressed.

As illustrated in FIG. 2, in the $CO_2$ gas separation apparatus according to the present embodiment, for example, a preliminary boosted gas supply path 13 is connected to the downstream side of the flow rate control valve V1 on the natural gas supply path 10. The valve V4 provided on the preliminary boosted gas supply path 13 is a decompression valve. Incidentally, the valve V4 may be configured by a pressure control valve. As the preliminary boosted gas, for example, nitrogen ($N_2$) gas can be used. Incidentally, the connection position of the preliminary boosted gas supply path 13 is the downstream side of the opening/closing valve V0 that is closed off at the time of preliminary pressure boosting described below, and may be the primary side of the inorganic separation membrane 100 and may be, for example, the upstream side of the flow rate control valve V1 as indicated by the dashed arrow of FIG. 2.

Figure 3:
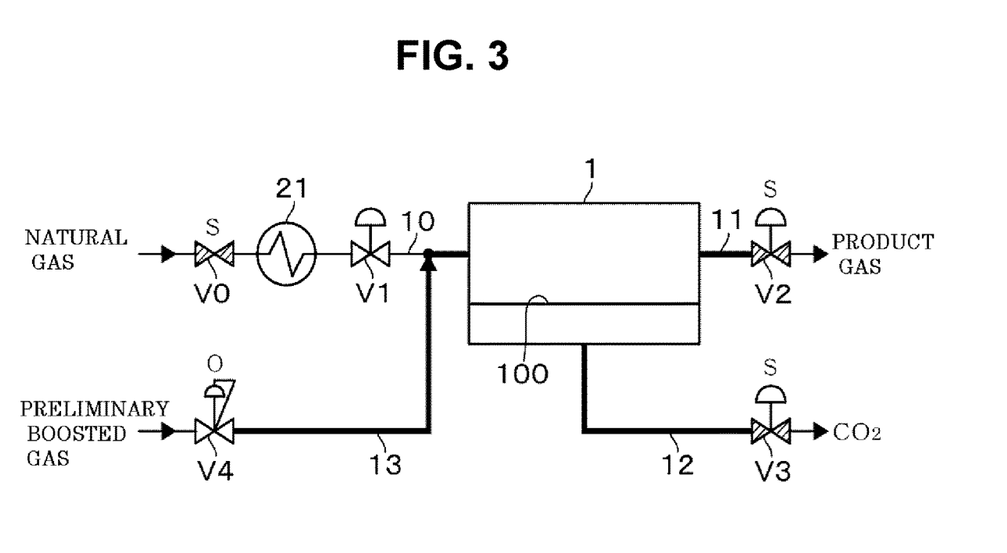
FIG. 3 is an operation explanatory diagram illustrating preliminary pressure boosting in the $CO_2$ gas separation apparatus.
Figure 4:
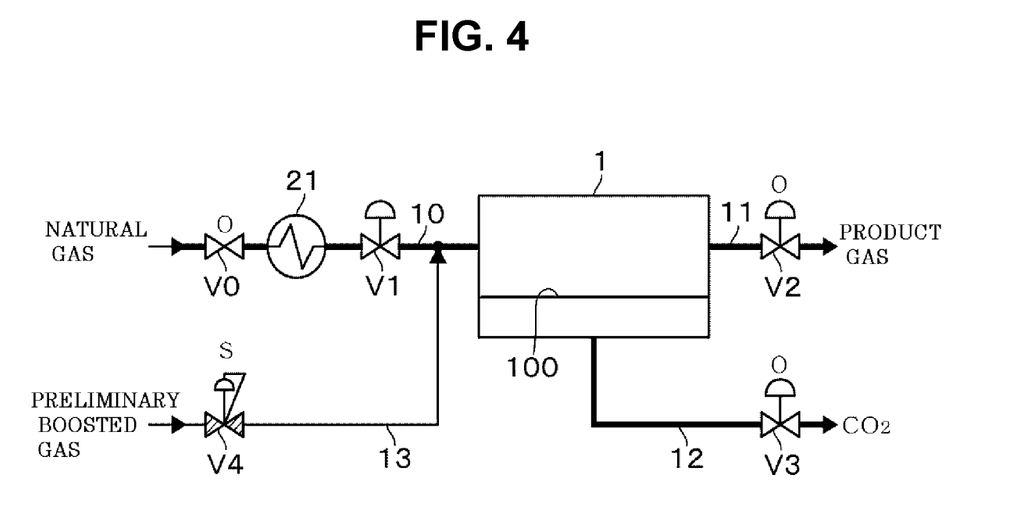
FIG. 4 is an operation explanatory diagram illustrating a gas separation treatment in the $CO_2$ gas separation apparatus.
Figure 5A:
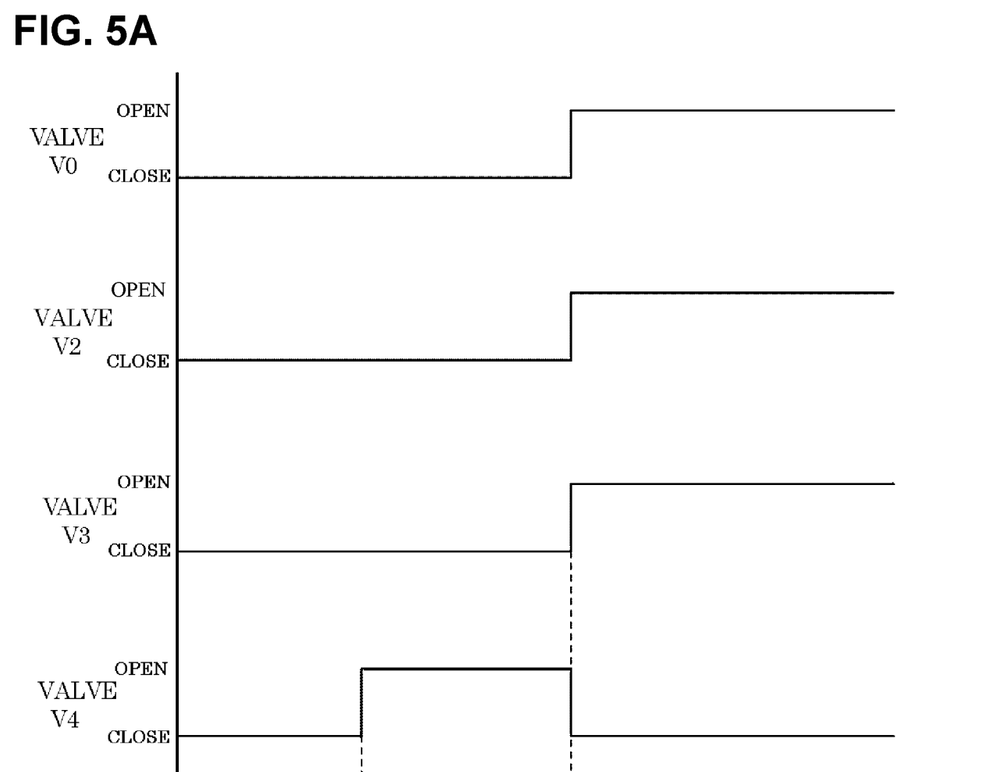
FIG. 5A and FIG. 5B are time charts showing opening/closing of each valve and a change in pressure in a separation membrane module in the $CO_2$ gas separation apparatus.
Figure 5B:
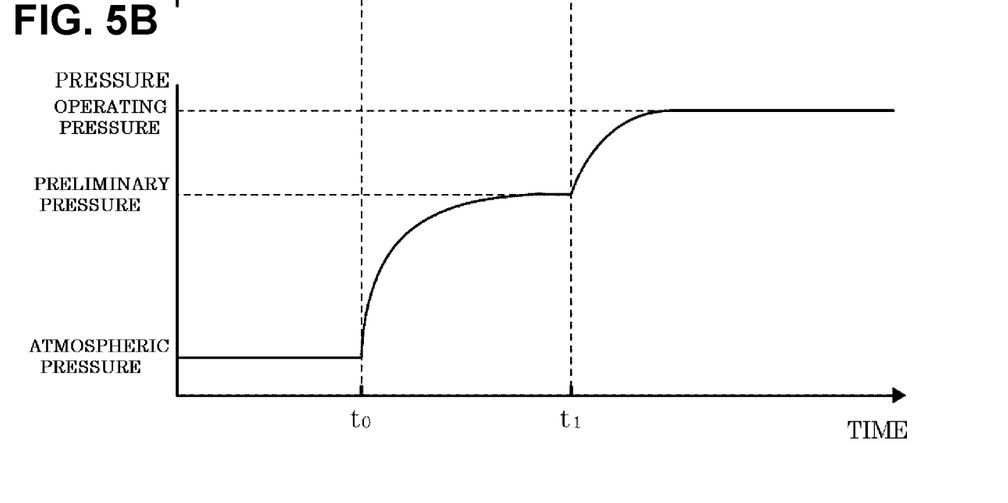

Subsequently, the action of the $CO_2$ gas separation apparatus having the above-described configuration will be described with reference to operation explanatory diagrams of FIGS. 3 and 4 and the time charts of FIG. 5A showing opening/closing of valves and FIG. 5B showing a pressure in the separation membrane module 1. In FIGS. 3 and 4, the open-valve state is indicated in white with reference numeral O and the closed-valve state is indicated by a diagonal line with reference numeral S. Incidentally, the closed-valve state indicates a state where the opening/closing valve V0, the pressure control valves V2 and V3, and the decompression valve V4 are closed off, and the open-valve state indicates a state where the opening/closing valve V0 is opened and a state where the pressure control valves V2 and V3 and the decompression valve V4 are opened to control the pressure.

For example, before the start of operation of the $CO_2$ gas separation apparatus, as shown in the time chart of FIG. 5B, the pressure in the separation membrane module 1 is an atmospheric pressure (=0.1 MPa) that is the stand-by pressure. Further, for example, at time $t_0$, as shown in FIG. 5A, in a state where the opening/closing valve V0 is closed and the pressure control valves V2 and V3 are closed off, the decompression valve V4 is opened. Thereby, the preliminary boosted gas ($N_2$ gas) is supplied to the primary side of the inorganic separation membrane 100 of the separation membrane module 1 in a low-pressure stand-by state. As a result, the pressure in the separation membrane module 1 is gradually increased, and the pressure in the separation membrane module 1 is controlled to a preliminary pressure between the stand-by pressure and an operating pressure when $CO_2$ gas is permeated through the inorganic separation membrane, for example, 8 MPaG.

Subsequently, at time $t_1$, the decompression valve V4 is closed to stop the supply of the preliminary boosted gas. Further, the opening/closing valve V0 is opened and the pressure control valves V2 and V3 are driven, and thus the pressure control in the separation membrane module 1 is started. In this example, natural gas having a temperature of 60° C. and a pressure of 15 MPaG ($CO_2$ gas 90%, $CH_4$ gas 10%; molar ratio) is supplied to the natural gas supply path 10. This natural gas is heated to, for example, 100° C. by the heating unit 21, passes through the flow rate control valve V1, and is supplied to the separation membrane module 1 whose pressure is preliminarily boosted to a pressure of 8 MPaG by the preliminary boosted gas. As a result, the pressure in the separation membrane module 1 is increased to the operating pressure (10 MPaG), and the $CO_2$ gas in the natural gas is permeated through the inorganic separation membrane 100 to decrease the content of the $CO_2$ gas.

When the pressure in the separation membrane module 1 is preliminarily boosted, for example, to a pressure of 8 MPaG in this way, as compared to a case where the supply of natural gas to the separation membrane module 1 in a state of the stand-by pressure (approximately atmospheric pressure) is suddenly started, the pressure difference between the pressure (15 MPaG) of natural gas to be supplied and the pressure (8 MPaG) in the separation membrane module 1 on the downstream side of the flow rate control valve V1 is decreased. Therefore, the temperature decrease caused by Joule-Thomson effect when natural gas flows into the downstream side of the flow rate control valve V1 is lowered. Thereby, the temperature of the natural gas can be maintained to a temperature higher than the condensation temperature or solidification temperature of the $CO_2$ gas. Thus, adhesion of liquefied $CO_2$ or dry ice in the separation membrane module 1 can be suppressed and degradation of the separation performance of the inorganic separation membrane 100 can be suppressed.

Then, formulization for calculating a suitable pressure of the preliminary pressure boosting from the operating pressure of the $CO_2$ gas separation apparatus described above and examination on the flow determining on whether the preliminary pressure boosting is required are performed. In this example, in a case where start-up of the separation membrane module 1 is performed without performing preliminary pressure boosting, a preliminary pressure with which the heating energy of the heating unit can be reduced by 20% by performing preliminary pressure boosting was defined as the target with respect to the heating energy [MW] of the heating unit 21 required for setting the temperature in the separation membrane module 1 not to be below the condensation temperature of $CO_2$ gas at the operating pressure. Incidentally, the target may be increased or decreased as necessary, and the following examination may be performed.

A mixed gas of $CO_2$ gas and $CH_4$ gas was used as the gas to be treated, and the supply temperature of each gas was set to 20° C. Furthermore, there was no pressure loss of the flow rate control valve V1, the opening/closing valve V0 was opened, and a pressure P1 of the gas to be treated and a pressure P2 in the separation membrane module 1 were set to be equal to each other. Further, the condensation temperature at P1 and P2 was regarded as a condensation point of the $CO_2$ gas under the condition in which P1 and P2 are equal to or lower than a critical pressure of the $CO_2$ gas, and a critical temperature was regarded as the condensation point of the CO$_2$ gas under the condition in which P1 and P2 are equal to or higher than the critical pressure. Incidentally, the condensation point and the condensation temperature are read as a sublimation point and a solidification temperature, respectively, under the pressure condition in which P1 and P2 are equal to or lower than the pressure of the triple point of CO$_2$. Then, the partial pressure (molar ratio) of the CO$_2$ gas was set to 40%, 50%, 60%, 70%, 80%, 90%, and 100%, the operating pressure for each gas to be treated was controlled in a range of 8 MPaG to 31 MPaG, and then a preliminary pressure necessary for reducing the heating energy by 20% was calculated by simulation using a process simulator PRO/II (manufactured by AVEVA).

Figure 6:
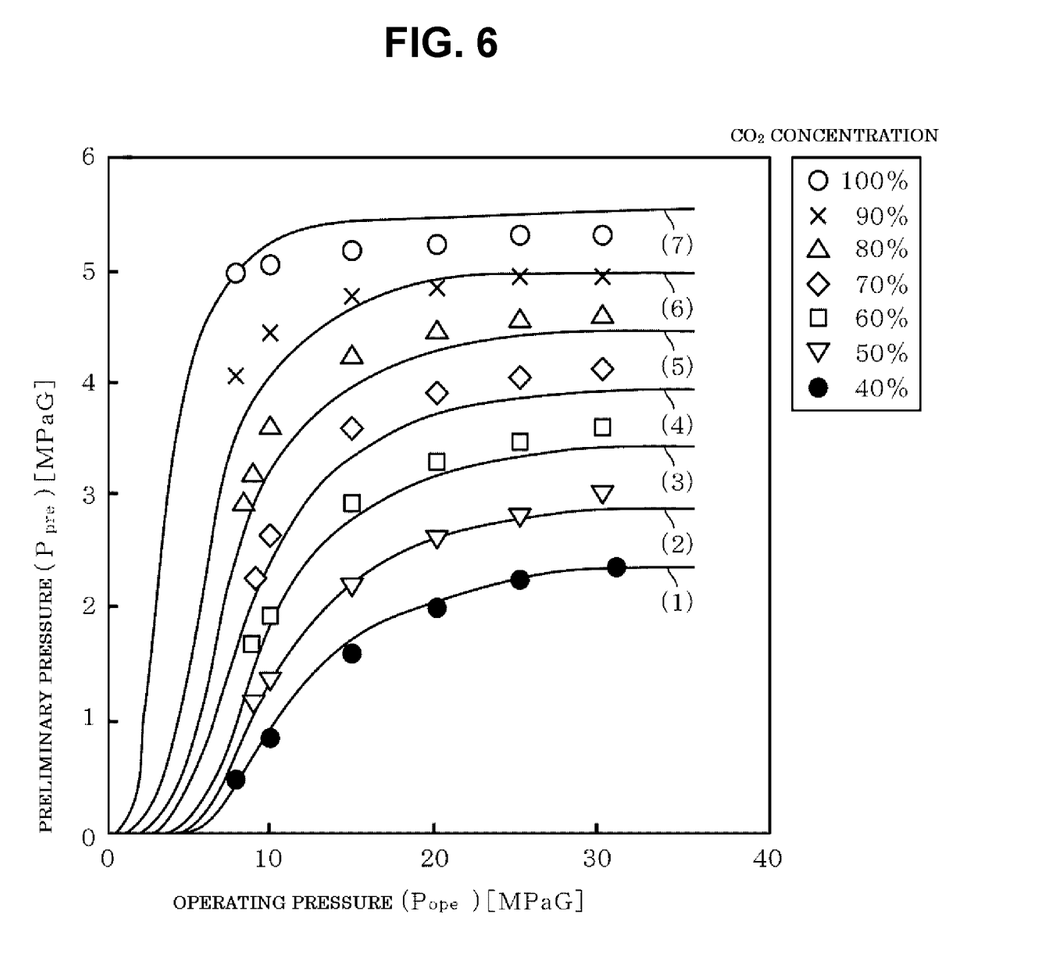
FIG. 6 is a graph showing a preliminary pressure with which heating energy can be reduced by 20%.
Figure 7:
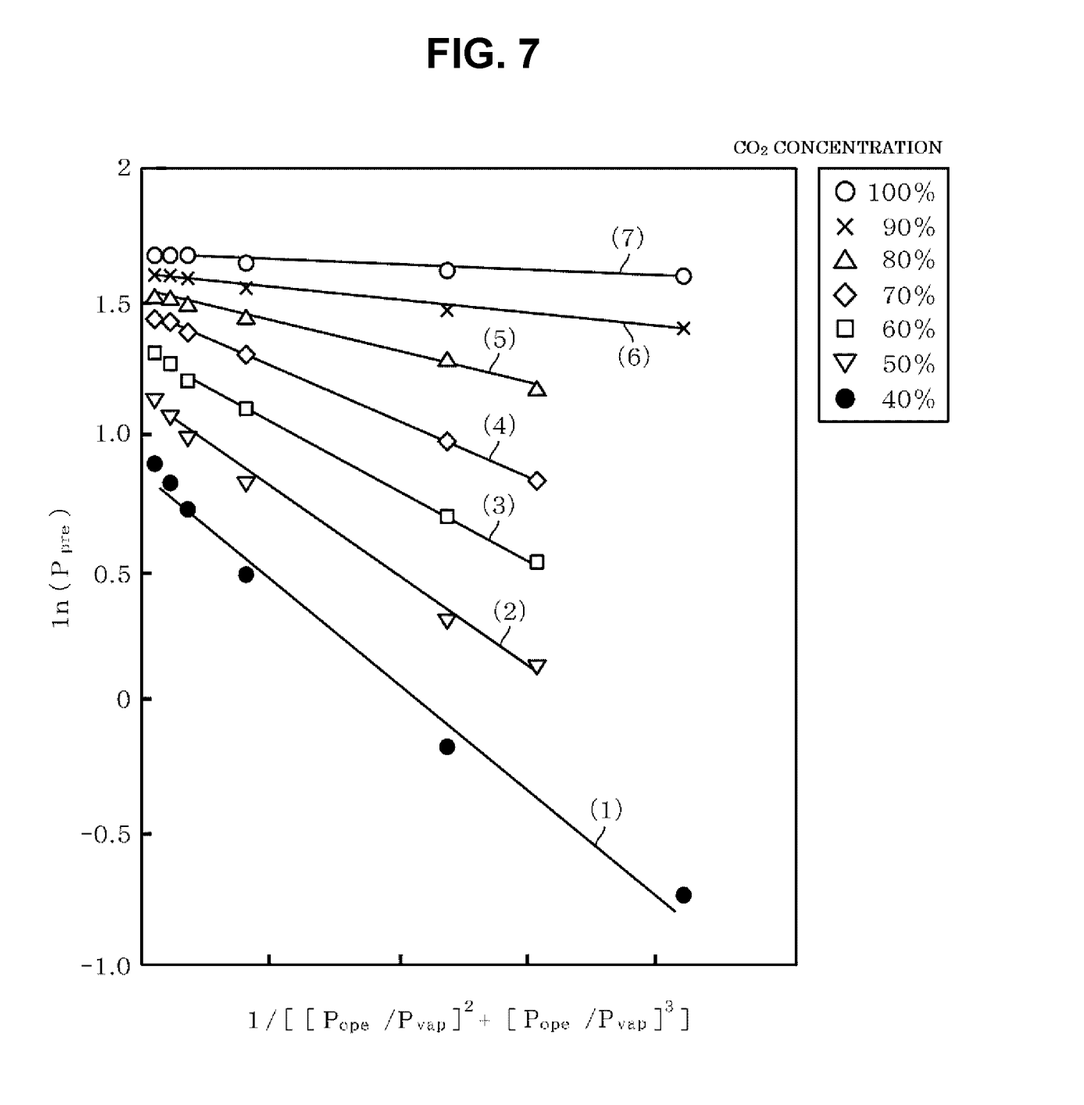
FIG. 7 is a graph logarithmically showing the preliminary pressure with which heating energy can be reduced by 20%.

FIG. 6 shows results of the above simulation and is a characteristic view in which the operating pressure $P_{Ope}$ when a separation treatment is performed in the separation membrane module 1 is shown in the abscissa axis and the preliminary pressure $P_{Pre}$ is shown in the longitudinal axis. Furthermore, FIG. 7 is a graph when the longitudinal axis is set as a natural logarithm of the preliminary pressure $P_{Pre}$. In FIG. 7, the abscissa axis is set as $1/[(P_{Ope}/P_{Vap})^2+(P_{Ope}/P_{Vap})^3]$ ($P_{Vap}$: vapor pressure of CO$_2$ at 20° C.).

Then, the calculation results of FIGS. 6 and 7 are approximated to obtain the following Approximation Formula (1). Furthermore, Formulas (2) and (3) indicate a and b in Formula (1), and $C_{CO2}$ is a concentration (molar ratio) of the CO$_2$ gas in the gas to be treated.

$$\ln(P_{Pre}) = a \times [1/[(P_{Ope}/P_{Vap})^2 + P_{Ope}/P_{Vap}^3]] + b \quad \text{Formula (1)}$$

$$a = 0.1318 \times (C_{CO2}) - 13.63 \quad \text{Formula (2)}$$

$$b = 0.8886 \times \ln(C_{CO2}) - 2.372 \quad \text{Formula (3)}$$

Graphs (1) to (7) in FIGS. 6 and 7 are graphs obtained by substituting 40%, 50%, 60%, 70%, 80%, 90%, and 100% as the partial pressure (molar ratio) of the CO$_2$ gas in Formula (1), respectively. As a result, square $R^2$ of the correlation coefficient in all of the graphs (1) to (7) in FIG. 7 showed a high value of 0.9 or more. Therefore, using Formula (1), the preliminary pressure equal to or higher than the pressure represented by the formula is set with respect to the operating pressure of the abscissa axis, and thereby, it is possible to set a preliminary pressure with which the heating energy by the heating unit 21 can be reduced by 20% or more. Then, upon performing start-up of the already-described CO$_2$ gas separation apparatus, it is sufficient that the pressure of the separation membrane module 1 is boosted to a pressure equal to or higher than the preliminary pressure calculated by Formula (1).

Figure 8:
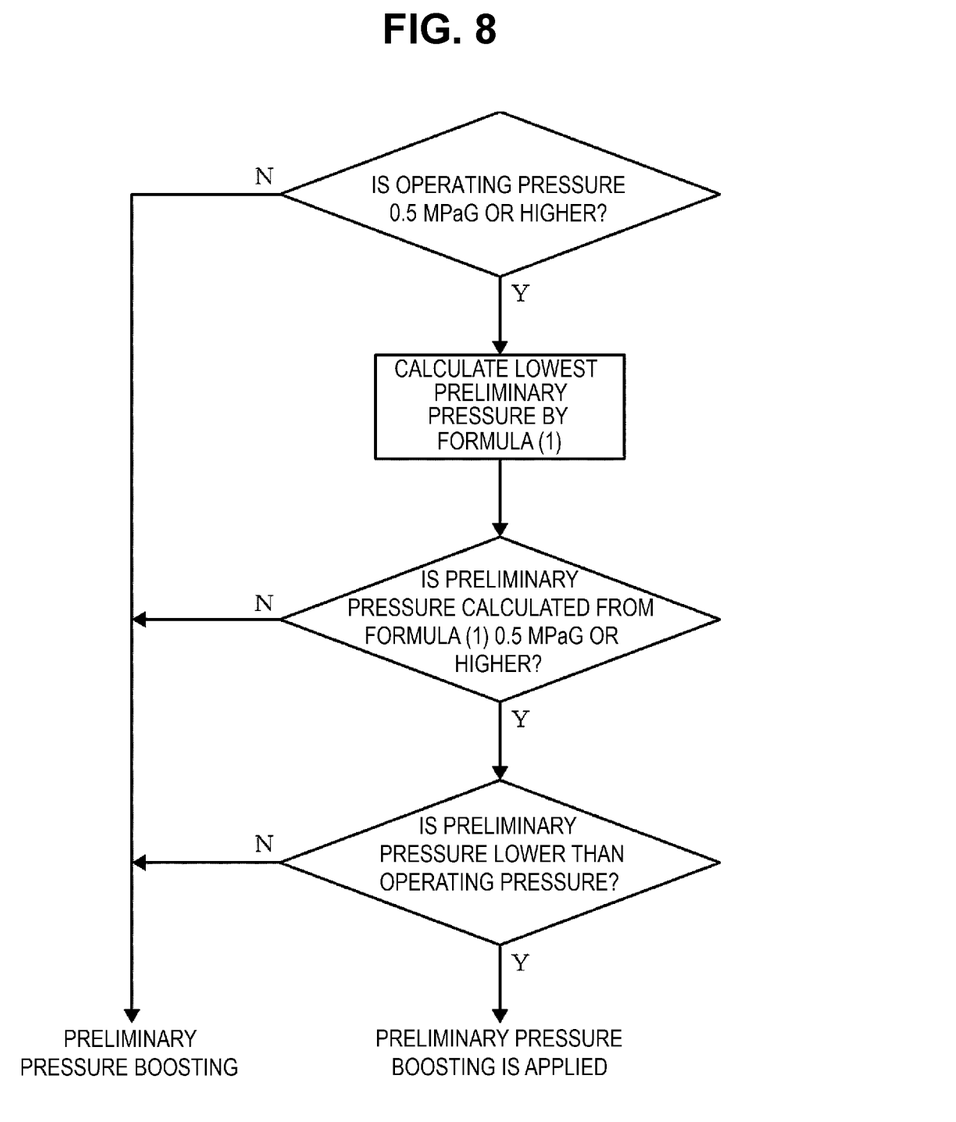
FIG. 8 is a flowchart of determination on whether preliminary pressure boosting is required.

Furthermore, determination on whether or not the calculated preliminary pressure value is adopted upon calculating a preliminary pressure by Formula (1) will be described. Hereinafter, determination on whether preliminary pressure boosting is required is performed according to the flowchart of FIG. 8. First, whether the set operating pressure is 0.5 MPaG or higher is determined (step S11). Then, in a case where the operating pressure is 0.5 MPaG or higher (step S11; Yes), a preliminary pressure is calculated by the above Formula (1) (step S12). Further, in a case where the preliminary pressure calculated by Formula (1) is 0.5 MPaG or higher (step S13; Yes), the preliminary pressure and the operating pressure are compared with each other, and in a case where the preliminary pressure is lower than the operating pressure (step S14; Yes), the preliminary pressure is applied. Then, in a case where the operating pressure is lower than 0.5 MPaG (step S11; No) and in a case where the preliminary pressure is lower than 0.5 MPaG (step S13; No), the preliminary pressure and the operating pressure are compared with each other, and in a case where the preliminary pressure is higher than the operating pressure (step S14; No), each preliminary pressure boosting is not required. By determining whether preliminary pressure boosting is required according to this flowchart, preliminary pressure boosting can be carried out only when required.

According to the above embodiment, upon separating CO$_2$ gas in high-pressure natural gas using the separation membrane module 1 including the inorganic separation membrane 100, the preliminary boosted gas is supplied to the separation membrane module 1 before the supply of natural gas is started, and the pressure on the primary side of the inorganic separation membrane 100 is boosted to the preliminary pressure between the stand-by pressure and the operating pressure. Thus, an abrupt decrease in temperature of the natural gas when the supply of the high-pressure natural gas is started to increase the pressure of the separation membrane module 1 to the operating pressure, can be suppressed. Therefore, condensation or solidification of CO$_2$ gas in the separation membrane module 1 can be suppressed, and thus performance degradation of the separation membrane module 1 can be suppressed.

Also in the CO$_2$ gas separation apparatus in which the gas to be treated is heated and then supplied, by performing preliminary pressure boosting, necessary thermal energy can be reduced as compared to a case where condensation or solidification of the CO$_2$ gas is suppressed only by heating using the heating unit 21.

The preliminary boosted gas is sufficient to be supplied to the primary side of the inorganic separation membrane 100 when preliminary pressure boosting is performed, and may be supplied to the upstream side of the flow rate control valve V1 or the upstream side of the heating unit 21.

Furthermore, regarding this pressure of the preliminary pressure boosting, a more suitable value can be simply set by using the already-described Formula (1). Further, in a case where the pressure difference between the operating pressure and the stand-by pressure is 0.5 MPa or higher, condensation or solidification of the CO$_2$ gas is likely to occur, and thus the great effect can be obtained by applying the invention, which is preferable. Further, the concentration of the CO$_2$ gas in the gas to be treated is preferably 30% or more and less than 100% in molar ratio and more preferably 40% or more and less than 100% in molar ratio. Furthermore, the preliminary boosted gas is a non-condensible gas and may be a gas that has no influence on the membrane performance of the inorganic separation membrane 100, and for example, helium gas or methane gas can also be used.

Furthermore, the invention may be applied to a CO$_2$ gas separation apparatus separating CO$_2$ gas by an organic separation membrane instead of an inorganic separation membrane.

EXAMPLES (Preliminary Pressure and Supplied Thermal Quantity Calculation)

The change in temperature or the change in pressure of the gas to be treated in the CO$_2$ gas separation apparatus when the CO$_2$ gas in the gas to be treated was separated by the CO$_2$ gas separation apparatus illustrated in FIG. 2, and the pressure of preliminary pressure boosting for maintaining the temperature of the gas to be treated in the separation membrane module 1 to a higher temperature than the condensation temperature were calculated by PRO/II (manufactured by AVEVA). Incidentally, the gas to be treated is a mixed gas obtained by mixing $CO_2$ gas and $CH_4$ gas at a molar ratio of 9:1, and is supplied to the $CO_2$ gas separation apparatus at 60° C. and 15 MPaG and at a flow rate of 50 Kg-mol/hr. A site on the upstream side of the opening/closing valve V0, a site on the downstream site of the heating unit 21 and on the upstream side of the flow rate control valve V1, and a site inside the separation membrane module 1 in the $CO_2$ gas separation apparatus are designated as sites St. 1, St. 2, and St. 3, respectively (see FIG. 2). Furthermore, the atmospheric pressure is set to 0 MPaG.

Reference Example

First, the change in temperature of the gas to be treated in a case where the gas to be treated was not heated by the heating unit and the $CO_2$ gas separation apparatus was started up without the preliminary boosted gas supplied was calculated. Table 1 shows the temperature, the pressure, and the flow rate of the gas to be treated at each site of the sites St. 1, St. 2, and St. 3.

TABLE 1

| | Site | | |
|---|---|---|---|
| | St. 1 | St. 2 | St. 3 |
| Temperature (° C.) | 60.000 | 60.000 | −90.203 |
| Pressure (MPaG) | 15.000 | 15.000 | 0.000 |
| Flow rate (Kg-mol/hr) | 500.000 | 500.000 | 500.000 |

As shown in Table 1, when the gas to be treated which has been supplied at 60° C. and 15 MPaG is supplied into the separation membrane module 1, the gas to be treated is cooled to −90° C. according to Joule-Thomson effect. This temperature is below the condensation temperature of the $CO_2$ gas (for example, $CO_2$ gas 30%, $CH_4$ gas 70%; −46° C.), and the $CO_2$ gas is condensed.

Comparative Example

Then, the thermal energy necessary for the heating unit 21 in the case of suppressing condensation of the $CO_2$ gas at the site St. 3 by heating the gas to be treated by the heating unit 21 without performing preliminary pressure boosting was calculated. Incidentally, the temperature at which condensation can be prevented at the site St. 3 was set to the condensation point at an operating pressure of 10 MPaG+10 K (46.2950° C.). The temperature, the pressure, and the flow rate of the gas to be treated at each site of the sites St. 1, St. 2, and St. 3 in the case of suppressing condensation of the $CO_2$ gas by heating the gas to be treated by the heating unit 21 are shown in Table 2.

TABLE 2

| | Site | | |
|---|---|---|---|
| | St. 1 | St. 2 | St. 3 |
| Temperature (° C.) | 60.000 | 132.337 | 46.295 |
| Pressure (MPaG) | 15.000 | 15.000 | 0.000 |
| Flow rate (Kg-mol/hr) | 500.000 | 500.000 | 500.000 |

As shown in Table 2, it was calculated that the temperature at the site St. 3 at an atmospheric pressure can be set to 46.295° C. by heating so that the temperature at the site St. 2 becomes 132.337° C. The thermal energy applied to the gas to be treated by the heating unit 21 at this time was 3.0520 M·KJ/hr.

Example

Further, the reduction amount of the thermal energy of the heating unit 21 when the preliminary pressure was set to 8 MPaG was calculated. Table 3 shows the change in pressure and temperature in the sites St. 1, St. 2, and St. 3 when the preliminary pressure is set to 8 MPaG.

TABLE 3

| | Site | | |
|---|---|---|---|
| | St. 1 | St. 2 | St. 3 |
| Temperature (° C.) | 60.000 | 83.049 | 46.295 |
| Pressure (MPaG) | 15.000 | 15.000 | 8.000 |
| Flow rate (Kg-mol/hr) | 500.000 | 500.000 | 500.000 |

As shown in Table 3, when the preliminary pressure is set to 8 MPaG, in order to maintain the temperature at the site St. 3 to 46.250° C. when the gas to be treated is supplied, it is necessary to heat the gas to be treated to 83.049° C. by the heating unit 21. Then, the thermal energy applied to the gas to be treated by the heating unit 21 when the gas to be treated was heated to 83.049° C. was 1.2196 M·KJ/hr, and the thermal energy required for the heating unit 21 was reduced by about 60%.

Therefore, it can be said that, by applying the invention, an abrupt decrease in temperature of the natural gas when the pressure of the separation membrane module 1 is increased to the operating pressure can be suppressed. Further, also in the $CO_2$ gas separation apparatus in which the gas to be treated is heated and then supplied, it can be said that necessary thermal energy can be reduced as compared to a case where condensation or solidification of the $CO_2$ gas is suppressed only by heating using the heating unit 21.

REFERENCE SIGNS LIST

1 Separation membrane module
10 Natural gas supply path
11 Product gas discharge path
12 $CO_2$ gas discharge path
13 Preliminary boosted gas supply path
21 Heating unit
100 Inorganic separation membrane

The invention claimed is:
1. A carbon dioxide gas separation method of permeating carbon dioxide gas in a gas to be treated from a primary side to a secondary side of a separation membrane provided in a separation membrane module to reduce the carbon dioxide gas in the gas to be treated, the method characterized by comprising:
 a step of supplying a preliminary boosted gas to the primary side of the separation membrane to boost the pressure to a preliminary pressure between a stand-by pressure and an operating pressure, before the gas to be treated is supplied at a supply pressure higher than the stand-by pressure to the separation membrane module in a state of the stand-by pressure lower than the operating pressure when the carbon dioxide gas is permeated through the separation membrane, in order to maintain a temperature of the gas to be treated in which a decrease in pressure occurs to a temperature higher than a condensation temperature of the carbon dioxide gas or a solidification temperature of the carbon dioxide gas;

a subsequent step of supplying the gas to be treated to the separation membrane module to increase the pressure of the separation membrane module to the operating pressure and to reduce the carbon dioxide gas in the gas to be treated; and wherein the preliminary pressure is a pressure of $P_{pre}$ or higher defined by the following Formula (1) to Formula (3) when the operating pressure is designated as $P_{Ope}$, a vapor pressure of the carbon dioxide gas at 20° C. is designated as $P_{Vap}$, and a concentration (molar ratio) of the carbon dioxide gas in the gas to be treated is designated as $C_{CO2}$, in which unit of measurement of pressure for each of said pressures is MPaG:

$$\ln(P_{Pre}) = a \times [1/[(P_{Ope}/P_{Vap})^2 + (P_{Ope}/P_{Vap})^3]] + b \quad \text{Formula (1)}$$

$$a = 0.1318 \times (C_{CO2}) - 13.63 \quad \text{Formula (2)}$$

$$b = 0.8886 \times \ln(C_{CO2}) - 2.372 \quad \text{Formula (3)}.$$

2. The carbon dioxide gas separation method according to claim 1, characterized in that the separation membrane is an inorganic separation membrane.

3. The carbon dioxide gas separation method according to claim 1, characterized in that the gas to be treated is heated by a heating unit and then supplied to the separation membrane module.

4. The carbon dioxide gas separation method according to claim 1, characterized in that a pressure difference between the operating pressure and the stand-by pressure is 0.5 MPa or higher.

5. The carbon dioxide gas separation method according to claim 1, characterized in that a concentration of the carbon dioxide gas in the gas to be treated is 30% or more and less than 100% in molar ratio.

6. The carbon dioxide gas separation method according to claim 1, characterized in that the preliminary boosted gas is at least one gas selected from nitrogen gas, helium gas, and methane gas.

7. A carbon dioxide gas separation apparatus separating carbon dioxide gas contained in a gas to be treated, the carbon dioxide gas separation apparatus characterized by comprising:

a separation membrane module including a separation membrane and allowing carbon dioxide gas to permeate from a primary side to a secondary side of the separation membrane to reduce the carbon dioxide gas in the gas to be treated;

a gas-to-be-treated supply path, provided with a first valve, connected to a space on the primary side in the separation membrane module and supplying the gas to be treated containing carbon dioxide gas;

a carbon dioxide gas flow path, provided with a second valve, connected to a space on the secondary side in the separation membrane module and allowing the carbon dioxide gas permeated through the separation membrane to flow out;

a non-permeation gas flow path, provided with a third valve, connected to the space on the primary side and allowing non-permeation gas obtained after the carbon dioxide gas is separated to flow out; and a preliminary boosted gas supply path, provided with a fourth valve, supplying a preliminary boosted gas to the primary side of the separation membrane in the separation membrane module, wherein the fourth valve is one of either a decompression valve or a pressure control valve configured to control the preliminary pressure to be a pressure of $P_{Pre}$ or higher defined by Formula (1) to Formula (3) when the operating pressure is designated as $P_{Ope}$, a vapor pressure of the carbon dioxide gas at 20° C. is designated as $P_{Vap}$, and a concentration (molar ratio) of the carbon dioxide gas in the gas to be treated is designated as $C_{CO2}$ in which unit of measurement of pressure for each of said pressures is MPaG, by supplying the preliminary boosted gas from the preliminary boosted gas supply path to boost the pressure in the space on the primary side to a preliminary pressure between a stand-by pressure and an operating, pressure under a condition in which the first, second and third valves are configured to be closed, before the gas to be treated is supplied at a supply pressure higher than the stand-by pressure to the separation membrane module in a state of the stand-by pressure lower than the operating pressure when the carbon dioxide gas is permeated through the separation membrane, in order to maintain a temperature of the gas to be treated in which a decrease in pressure occurs to a temperature higher than a condensation temperature of the carbon dioxide gas or a solidification temperature of the carbon dioxide gas:

$$\ln(P_{Pre}) = a \times [1/[(P_{Ope}/P_{Vap})^2 + (P_{Ope}/P_{Vap})^3]] + b \quad \text{Formula (1)}$$

$$a = 0.1318 \times (C_{CO2}) - 13.63 \quad \text{Formula (2)}$$

$$b = 0.8886 \times \ln(C_{CO2}) - 2.372 \quad \text{Formula (3)}.$$

8. The carbon dioxide gas separation apparatus according to claim 7, characterized in that the separation membrane is an inorganic separation membrane.

9. The carbon dioxide gas separation apparatus according to claim 7, characterized in that the gas-to-be-treated supply path includes a heating unit for heating the gas to be treated and then supplying the heated gas to the separation membrane module.

10. The carbon dioxide gas separation apparatus according to claim 7, characterized in that a pressure difference between the operating pressure and the stand-by pressure is 0.5 MPa or higher.

11. The carbon dioxide gas separation apparatus according to claim 7, characterized in that a concentration of the carbon dioxide gas in the gas to be treated is 30% or more and less than 100% in molar ratio.

12. The carbon dioxide gas separation apparatus according to claim 7, characterized in that the preliminary boosted gas is at least one gas selected from nitrogen gas, helium gas, and methane gas.

* * * * *